(12) United States Patent
Naganuma

(10) Patent No.: US 7,316,514 B2
(45) Date of Patent: Jan. 8, 2008

(54) LIGHT CONTROLLER AND IMAGE PICKUP DEVICE INCLUDING THE SAME

(75) Inventor: Hiroaki Naganuma, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 356 days.

(21) Appl. No.: 11/110,738

(22) Filed: Apr. 21, 2005

(65) Prior Publication Data

US 2006/0039695 A1    Feb. 23, 2006

(30) Foreign Application Priority Data

Aug. 20, 2004   (JP)   ............................. 2004-240291

(51) Int. Cl.
  *G03B 9/40*   (2006.01)
  *G03B 9/02*   (2006.01)
(52) U.S. Cl. ...................... 396/450; 396/485; 396/489; 396/505
(58) Field of Classification Search ................ 396/450, 396/484–489, 505, 508
  See application file for complete search history.

(56) References Cited

U.S. PATENT DOCUMENTS

| | | | | |
|---|---|---|---|---|
| 4,047,807 A | * | 9/1977 | Okano et al. ............... | 359/234 |
| 4,797,700 A | * | 1/1989 | Tsuji et al. ................. | 396/508 |
| 4,884,091 A | * | 11/1989 | Nakagomi ................... | 396/508 |
| 5,749,015 A | * | 5/1998 | Sato et al. .................. | 396/508 |
| 6,347,191 B1 | * | 2/2002 | Kurosu ........................ | 396/221 |
| 6,667,678 B2 | * | 12/2003 | Kurosu et al. .............. | 335/220 |
| 2005/0123290 A1 | * | 6/2005 | Hasegawa et al. .......... | 396/484 |

FOREIGN PATENT DOCUMENTS

JP    11-194382    7/1999

* cited by examiner

*Primary Examiner*—W. B. Perkey
(74) *Attorney, Agent, or Firm*—Manabu Kanesaka

(57) ABSTRACT

A light controller includes a substrate that has an optical path opening; at least a pair of blades that is reciprocally supported on the substrate and opens and closes the optical path opening; and a driver unit that drives the opening and closing of the pair of blades. The pair of blades is displaced movably on the substrate between an open position where the optical path opening is opened and a closed position where the optical path opening is closed by overlapping with each other. The driver unit and the pair of blades are connected for driving by a transmission unit, and the transmission unit transmits drive power such that one of the pair of blades can be moved at a higher speed than the other blade within a predetermined travel range between the open position and closed position.

9 Claims, 8 Drawing Sheets

LIGHT CONTROLLER AND IMAGE PICKUP DEVICE INCLUDING THE SAME

BACKGROUND OF THE INVENTION AND RELATED ART STATEMENT

The present invention relates to a light controller for adjusting an amount of shooting light for a still camera, a video camera, and so on. In particular, the present invention relates to a blade and a driver for driving the blade used for a light controller disposed in a shooting optical path for controlling an amount of light passing therethrough to a proper amount of shooting light with multiple blades, a shutter device for shutting off light passing through a shooting optical path, and a light controller for controlling an amount of shooting light.

Generally, a light controller has multiple blades in an optical path and controls an amount of light reaching an image pickup device such as a photoelectric transformer and a light-sensitive film by opening or closing the blades. The control of an amount of light may be implemented with diaphragms for adjusting an amount of light reaching the image pickup device to a proper amount of light exposure or shutter blades for shutting light reaching the image pickup device off. Alternatively, the control of an amount of light may be implemented with a dual-purpose diaphragm and shutter device for controlling the opening and closing of blades at predetermined positions and then moving the blades to the closed position, so that the adjustment of an amount of light exposure and shutter operation can be performed simultaneously. These blades include multiple, for example, a pair of blades attached to a substrate having an optical path opening, and a transmitting arm at an axis of rotation of a drive motor is associated with the blades, whereby the optical axis opening can be adjusted in an arbitrary manner.

A conventional device is disclosed in Japanese Patent Publication (Kokai) No. 11-194382. Japanese Patent Publication (Kokai) No. 11-194382 discloses a structure including a substrate having an optical path opening in an shooting optical path and a pair of blades attached to a substrate for opening and closing the optical path opening, so that the opening/closing of the pair of blades can be driven by a drive motor. The pair of blades has tips facing toward the optical path opening, base ends slidably supported by the substrate, and slits in the pair of blades to which associating pins of driving arms attached at an axis of rotation of the drive motor fit, so that the blades can be moved in opposite directions. The driving arms and slits are conventionally configured such that the drive motor and the pair of blades can move at an equal speed. Accordingly, the size of the optical path opening can be adjusted or the opening can be closed by synchronously moving the blades in opposite directions by an equal amount with reference to the center of the optical path opening.

The structure for opening and closing the blades in the conventional device will be described with reference to FIGS. 6A-6C to 8A-8C. FIGS. 6A to 6C show a case that an optical path opening X5 is closed and opened by a first blade X1 and second blade X2. The blades are guided and supported so as to move in horizontally opposite directions with respect to a substrate (not shown). The first blade X1 has an arc-shaped opening edge, and the second blade X2 has a semicircular-cl)t opening edge. The first blade X1 and second blade X2 have slits X3 and X4, respectively, and pins of transmitting arms mounted at an axis of rotation of a driver are configured to associate thereto. The slits X3 and X4 tilt symmetrically at an equal angle such that rotational forces of the transmitting pins can be uniformly transmitted to the first blade X1 and second blade X2.

With this construction, the half-open state shown in FIG. 6B is obtained when the first blade X1 is moved to the left side in FIG. 6A and the second blade X2 is moved to the right side in FIG. 6A from the entirely open state in FIG. 6A. The entirely closed state shown in FIG. 6C is obtained when the first blade X1 and second blade X2 are moved further. The first blade X1 has, at the center thereof, a larger opening than the optical path opening X5 and further has an opening/closing portion X6 at the right edge for covering the optical path opening X5. Thus, the first blade X1 at the state in FIG. 6A completely opens the optical path opening X5 (entirely open state), and the blade is at an open position. The right side of the optical path opening X5 is covered (half-open state) in the state in FIG. 6B, and the blade is positioned at the middle position. The optical path opening X5 is completely covered (entirely closed state) in the state in FIG. 6C, and the blade is at a closed position in this state.

On the other hand, as shown in FIG. 6C, the second blade X2 has a semicircular right edge and completely opens the optical path opening X5 at the open state in FIG. 6A, covers the left edge of the optical path opening X5 at the middle position in FIG. 6B, and overlaps with the first blade X1 by shown Delta 1 at the closed position in FIG. 6C. There, the entire length (L3) of the two first and second blades are maximum at the entirely open state where the blades are positioned at the open positions in FIG. 6A, and the substrate supporting these blades is longer than the length L3. Next, the first and second blades form an aperture at the center by covering a part of the optical path opening X5 at the middle position in FIG. 6B, and the aperture has large and small similar apertures about the optical axis of the optical path opening.

Thus, the first and second blades always form an aperture about the optical axis by being moved and displaced by an equal amount from the entirely open state. At the entirely closed positions in FIG. 6C, the first and second blades overlap with each other only by shown Delta 1. The overlapping keeps an amount of overlapping enough for preventing light from entering from a gap caused by a deformation or vibrations of the blades. The amount of overlapping between the blades at the entirely closed state is influenced by a rebound caused when the blades are moved fast and then stopped at the closed positions.

In particular, in a fast diaphragm device or fast shutter device, for example, is attempted, the rebounds of the blades moving fast may allow unnecessary light to enter. Therefore, the amount of overlapping must be increased. If an amount of overlapping Delta 2 (Delta 2>Delta 1) is increased as shown in FIG. 7C, a gap G1 occurs between the edge of the first blade X1 and the edge of the optical path opening. The gap G1 is increased as the amount of overlapping Delta 2 increases while the blades having a reduced size cause a large gap by the reduced amount.

FIGS. 8A to 8C show a case that the length of the blades is increased by L4 from the one shown in FIGS. 6A to 7C. No gap occurs in processes that the blades move from the entirely open state in FIG. 8A to the aperture position in FIG. 8B and to the closed position in FIG. 8C. However, the total length of the blades increases (L3+L4), and the device is larger than those in FIGS. 6A to 7C.

In this way, in a conventional device, two blades facing toward an optical path opening move at an equal speed from the entirely open positions to the aperture positions and then to the entirely closed positions about the optical axis.

Therefore, the amount of overlapping must be increased in order to prevent light from entering due to rebounds of the blades at closed position when the blades are moved fast particularly in a shutter device or dual-purpose diaphragm and shutter device.

As described above, a conventional device having multiple blades in the optical path opening moves and displaces the multiple blades at an equal speed by an equal amount in order to control an amount of light passing through the optical path opening or shutting passing light off. Therefore, the amount of overlapping of the blades at the closed positions must be increased in a shutter device or dual-purpose diaphragm and shutter device that opens and closes the blades fast in order to prevent an effect of a rebound caused when the blades are closed.

As a result, the size of the device is increased as the amount of overlapping between the blades increases. Furthermore, the load on the driver for driving the blades is also large, which disadvantageously increases the size of the entire device.

Accordingly, it is an object of the present invention to provide a small and inexpensive light controller having a simple structure including multiple blades facing an optical path opening and moving at different speeds between the entirely open position and the entirely closed position; so that the blades can be opened and closed fast without particularly increasing an amount of overlapping between the blades, causing a gap between the blades at entirely closed state and the optical path opening, and causing a gap between the blades due to a rebound caused when the blades stop.

Further objects and advantages of the invention will be apparent from the following description of the invention.

SUMMARY OF THE INVENTION

In order to solve the problems, according to the invention, a light controller includes a substrate that has an optical path opening; at least a pair of blades that is reciprocally supported on the substrate and opens and closes the optical path opening; and a driver unit that drives the opening and closing of the pair of blades. The pair of blades is displaced movably on the substrate between an open position where the optical path opening is opened and a closed position where the optical path opening is closed by overlapping with each other. The driver unit and the pair of blades are connected for driving by a transmission unit, and the transmission unit transmits driving such that one of the pair of blades can be moved at a higher travel speed than that of the other blade within a predetermined travel range between the open position and closed position.

The transmission unit may move and displace the pair of blades at a substantially equal speed between the open position and a middle position spaced by a predetermined distance from the open position, and move and displace one of the pair of blades at a higher speed than that of the other blade between the middle position and the closed position. The blades may overlap with each other at the closed position. The transmission unit may include a slit hole in each of the pair of blades and a transmitting arm member having a pair of drive pins associating with the slit holes. The transmitting arm member may be provided at an axis of rotation of the driver unit. The slit holes may have a symmetrical portion to achieve an equal amount of displacement and asymmetrical portion to achieve a different amount of displacements for movement of the pair of drive pins.

According to the invention, a light controller includes a substrate that has an optical path opening; first and second blades that are reciprocally mounted on the substrate and open and close the optical path opening; a transmitting arm member that transmits driving forces in opposite directions against each other to the first and second blades; and a driver unit that drives the rotation of the transmitting arm member. The first blade is connected to the transmitting arm member so as to be moved and displaced at a substantially equal speed between the open position and closed position. The second blade is connected to the transmitting arm member so as to be moved and displaced at a substantially uniform speed to that of the first blade between the open position and a predetermined middle position, and moved and displaced at a higher speed than that of the first blade between the middle position and the closed position.

According to the invention, an image pickup device includes an image-forming lens that is disposed in an optical path from a subject, and an image pickup unit that images light from the image-forming lens. The driver unit may have a control unit that moves the blades from the open position to the middle position in accordance with an amount of shooting light exposure of the image pickup unit, and moves the blades from the middle position to the closed position in accordance with the completion of shooting/imaging by the image pickup unit. The pair of blades may control an amount of light passing through the optical path opening at the middle position.

BRIEF DESCRIPTION OF THE DRAWINGS

FIGS. 3A and 3B are enlarged plan views showing blades of the device in FIG. 2, wherein FIG. 3A shows a first blade, and FIG. 3B shows a second blade;

FIGS. 4A to 4C are explanatory views showing opening and closing operations of the blades, wherein FIG. 4A shows the blades at an open position; FIG. 4B shows the blades at a middle position; and FIG. 4C shows the blades at a closed position;

FIGS. 6A to 6C are explanatory diagrams showing open and closed structures of blades in a conventional device, wherein FIG. 6A shows the blades at the entirely open state, FIG. 6B shows the blades at a middle state, and FIG. 6C shows the blades at the entirely closed state;

FIGS. 7A to 7C show explanatory diagrams showing different open and closed structures of the blades from those in FIGS. 6A to 6C, wherein FIG. 7A shows the blades at the entirely open state, FIG. 7B shows the blades at a middle state, and FIG. 7C shows the blades at the entirely closed state; and FIGS. 8A to 8C are explanatory diagrams showing different open and closed structures from those in FIGS. 6A-6C to 7A-7C, wherein FIG. 8A shows the blades at the entirely open state, FIG. 8B shows the blades at a middle state, and FIG. 8C shows the blades at the entirely closed state.

DETAILED DESCRIPTION OF PREFERRED EMBODIMENTS

Hereunder, embodiments of the invention will be described in detail with reference to the accompanying drawings.

Figure 1:
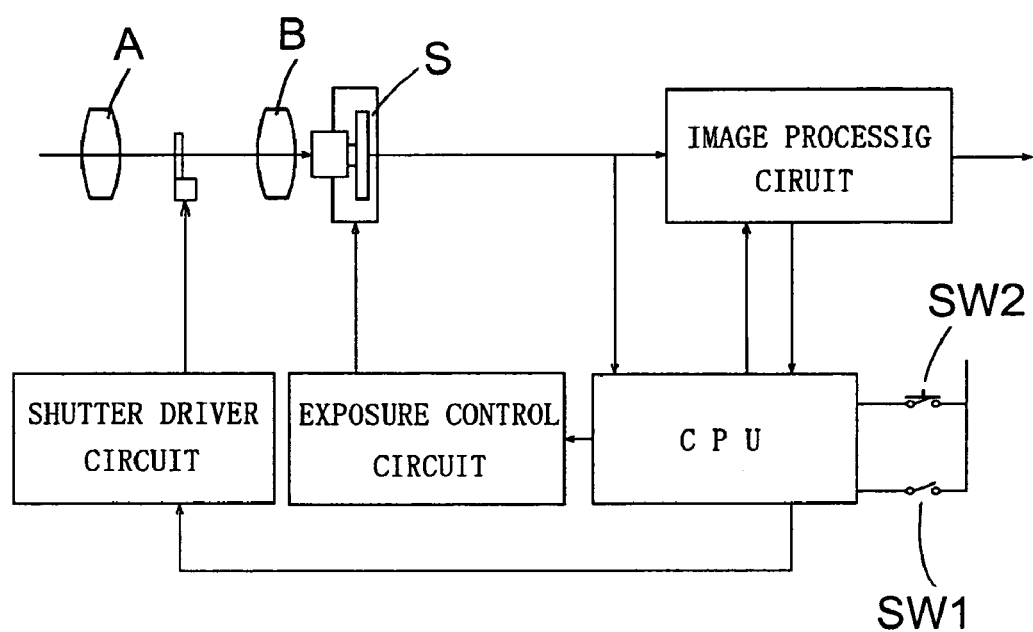
FIG. 1 is a schematic diagram of an image pickup device including a light controller according to an embodiment of the invention.
Figure 2:
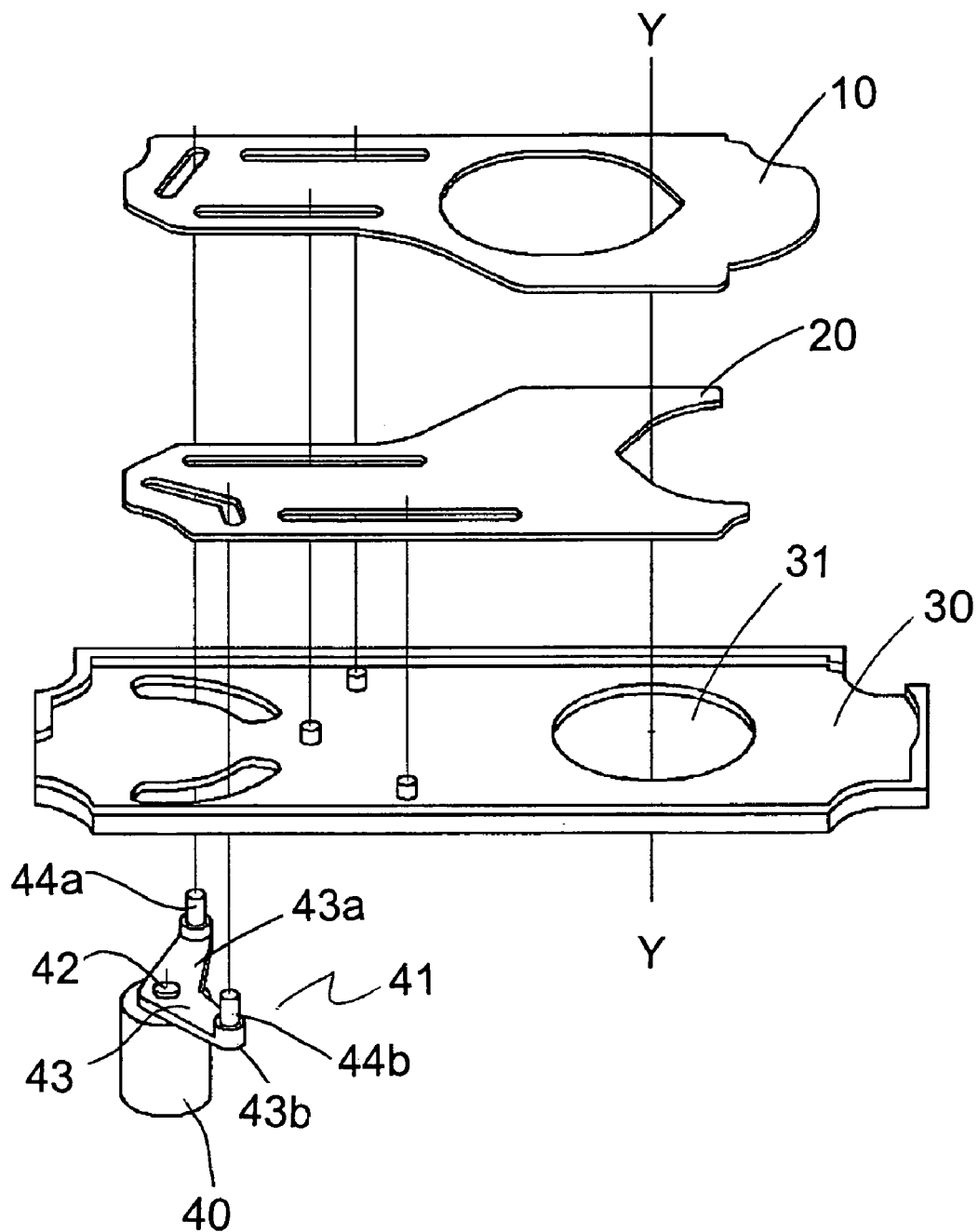
FIG. 2 is an exploded perspective view showing an example of the light controller of the invention.
Figure 3A:
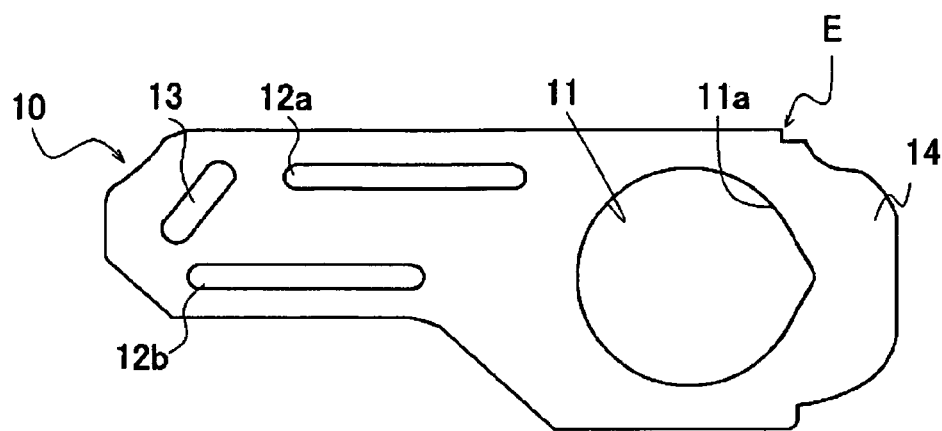
Figure 3B:
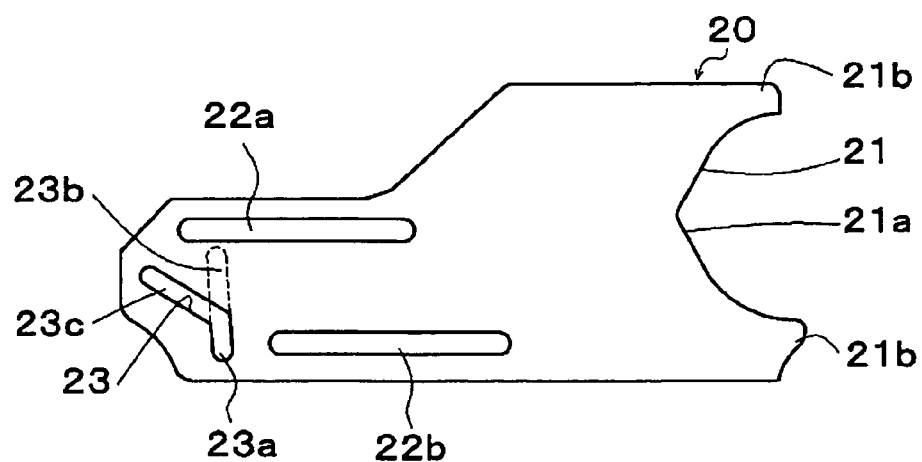
Figure 4A:
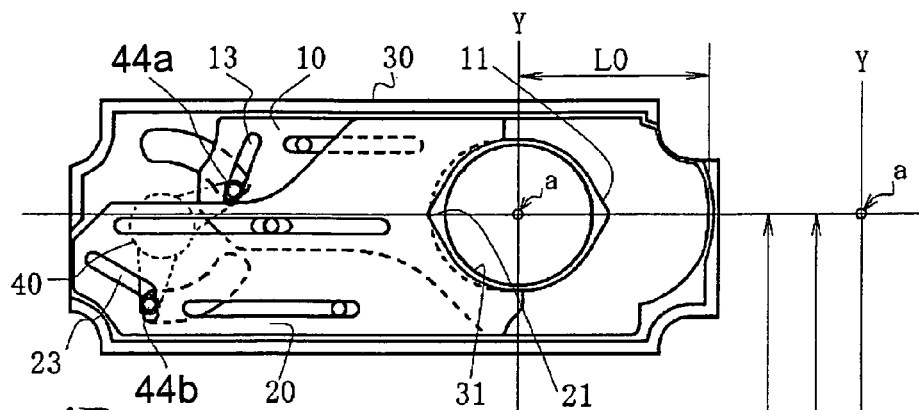
Figure 4B:
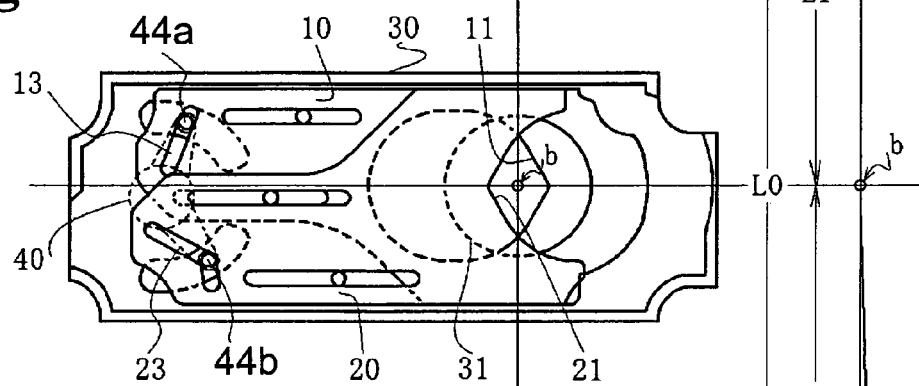
Figure 4C:
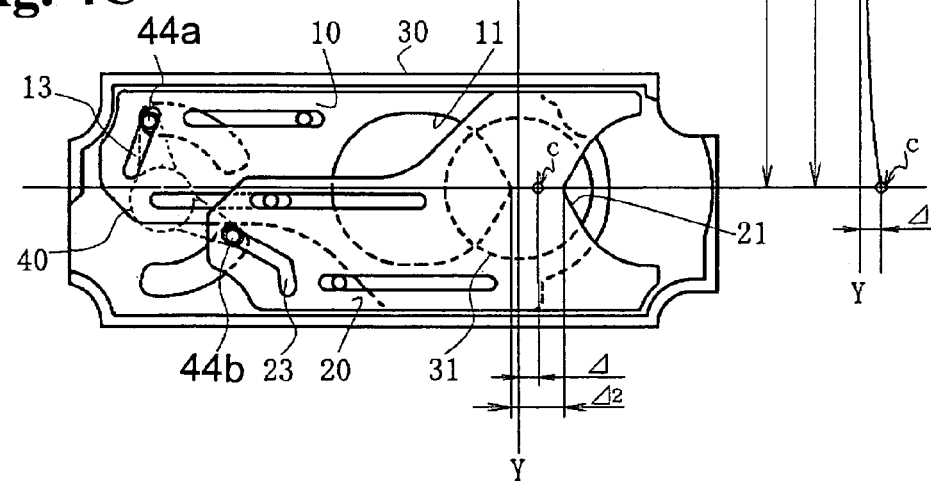
Figures 5A, 5B:
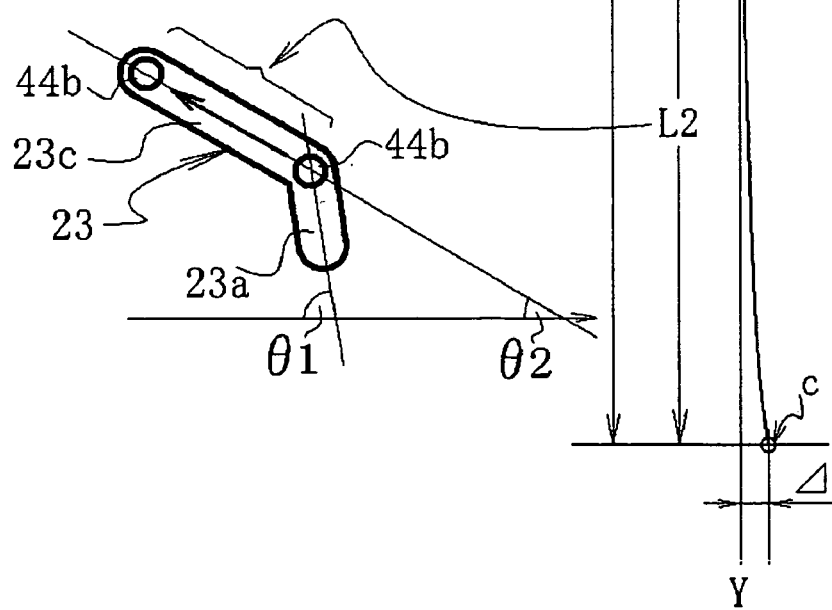
FIGS. 5A and 5B are explanatory diagrams showing a relationship between a drive pin and a slit hole included in a drive transfer mechanism in the construction in FIGS. 4A to 4C.

FIG. 1 is a schematic diagram of an image pickup device including a light controller according to an embodiment of the invention. FIG. 2 is an exploded perspective view showing an example of the light controller of the invention. FIGS. 3A and 3B are enlarged plan views showing blades. FIGS. 4A to 4C are diagrams showing opening and closing operations of the blades. FIGS. 5A and 5B are diagrams showing a relationship between a drive pin and a slit hole included in a drive transfer mechanism in the construction in FIGS. 4A to 4C.

A light controller E shown in FIG. 2 includes a substrate 30 having an optical path opening 31; a blade unit mounted on the substrate 30; and a driver 40 for opening and closing the blade unit. The substrate 30 is formed by molding a synthetic resin or press-processing a metal plate and supports the blade unit (described later). The substrate 30 is attachable to the driver 40 for driving the blade unit to open and close according to a built-in space in a camera apparatus. The substrate 30 has the optical path opening 31 about a shooting optical axis Y-Y of a camera apparatus, for example. The optical path opening 31 has a diameter slightly larger than the maximum diameter of the optical path required for shooting. Multiple blades 10 and 20 in the blade unit are placed over the optical path opening 31. The blade unit includes the first blade 10 and second blade 20.

The first and second blades 10 and 20 have forms suitable for one of a diaphragm for adjusting to increase and decease an amount of light passing through the optical path opening 31; a shutter blade for closing the optical path opening 31; and a dual-purpose diaphragm and shutter blade for adjusting an amount of light (amount of light exposure) passing through the optical path opening 31 and closing the optical path. In the embodiment, the blades have forms for functioning as a dual-purpose diaphragm and shutter blade. That is, the first blade 10 has an opening 11, a diaphragm plane 11a that is a partially sharp edge of the opening 11, and a shutter functioning part 14 covering a part of the optical path opening 31. The second blade 20 has a semicircular opening 21 and a diaphragm plane 21a that is a partially sharp edge of the opening 21.

The first and second blades 10 and 20 have forms depending on whether the first and second blades 10 and 20 are to be slidably supported or rotatably supported to the substrate 30. The forms of the blades may differ between the two-blade construction and the three-or-more-blade construction. Because the blade unit includes the two blades that move (slide) in opposite directions on one straight line, the first blade 10 requires the opening 11 having a semicircular form on the right side, and the second blade 20 requires the opening 21 having a semicircular form on the left side.

The semicircular openings 11 and 21 on the left and right sides move closer or away to open or close the optical path opening 31. Since the shown one controls an amount of light exposure for shooting, for example, the opening 11 has the sharp diaphragm plane 11a in the first blade 10, and the opening 21 has the sharp diaphragm plane 21a in the second blade 20. This is because the first and second blades form a substantially rhombus aperture, and the diameter of the aperture may be increased or decreased to obtain an approximate size of the aperture for controlling an amount of light passing through the opening 11.

Hence, the forms of the openings 11 and 21 depend on the defined form of the aperture. Therefore, the substrate 30 has guide ribs 36a and 36b and guide pins 34a, 34b and 34c for slidably guiding the first blade 10 and second blade 20. The first blade 10 has guide grooves 12a and 12b, and the second blade 20 has guide grooves 22a and 22b. In other words, the first blade 10 has the opening 11 and the parallel guide grooves 12a and 12b, and guide pins 34a and 34b implanted to the substrate 30 associate with the guide grooves 12a and 12b, respectively.

The side edge (on the upper side of FIG. 2) of the first blade 10 associates with the guide rib 36b of the substrate 30. Thus, the first blade 10 can be slidably guided horizontally in FIG. 2 along the guide pins 34a and 34b and guide rib 36b. Also, the second blade 20 has the opening 21 and parallel guide grooves 22a and 22b, and the guide pins 34b and 34c fit into the guide grooves 22a and 22b, respectively. The side edge (on the lower side of FIG. 2) of the second blade 20 associates with the guide rib 36a of the substrate 30.

With this construction, the first blade 10 and second blade 20 are slidably supported by the substrate 30 on one straight line (in the horizontal direction of FIG. 2), and the first and second blades 10 and 20 are movable to pass the optical path opening 31 in the substrate 30.

The driver 40 for opening and closing the blades will be described next. Various drivers such as a general electromagnetic motor may be adopted as the driver 40, or the driver 40 may have a construction as follows. That is, a cylindrical permanent magnet is provided with an axis of rotation to form a magnet rotor, and the rotor is rotatably supported by a shaft within a coil frame wound by a coil to form a stator. The rotor is rotated by a predetermined or smaller angle by causing a magnetic field in the coil in the direction orthogonal to the N-S magnetic pole of the magnet rotor, and the outer circumference is covered by a yoke. FIG. 2 includes a driver body 41 and an axis of rotation 42 of the rotor. The axis of rotation 42 has transmitting arms 43, and the transmitting arms 43 have drive pins 44a and 44b at the tip of the shown arm portion 43a and the tip of the shown arm portion 43b, respectively. In other words, the axis of rotation 42 of the driver 41 has the transmitting arms 43 having a pair of the drive pins 44a and 44b, and the rotation of the axis of rotation 42 transmits movements in opposite directions to each other to the pair of spaced drive pins 44a and 44b.

Therefore, the transmitting arms 43 do not have to be integrally attached to the axis of rotation 42 of the driver 41. For example, a ring-shaped transmitting member may be rotatably mounted to the substrate 30 and connected to the axis of rotation of the driver to cause a rotational movement and may have a drive pin. The driver 41 having the construction may be screwed, for example, to the back face of the substrate 30 having blades, and the drive pins 44a and 44b of the transmitting arms 43 may be connected to the first and second blades 10 and 20 as described below.

The substrate 30 has clearance grooves 35a and 35b for the drive pins 44a and 44b, and the drive pins 44a and 44b are inserted through the clearance grooves 35a and 36b and project on the side of the surface of the substrate 30 having the blades 10 and 20. The first and second blades have slit holes 13 and 23 to associate with the drive pins 44a and 44b. The invention includes a transmission unit including the drive pins of the driver and the slit holes of the blades, which has the following construction.

With this construction, the drive pins 44a and 44b are spaced uniformly from the axis of rotation 42, and the rotation of the axis of rotation 42 moves the drive pins 44*a* and 44*b* by an equal amount. Therefore, the slit hole 13 of the first blade 10 associates with the drive pin 44*a*, so that the first blade 10 can be moved and displaced at a uniform speed in the entire opening/closing range of the first blade 10. On the other hand, the slit hole 23 of the second blade 20 associates with the drive pin 44*b* and has slit associating planes 23*a* and 23*c*. The second blade 20 is moved and displaced at a first speed on the slit associating plane 23*a* and at a second speed on the slit associating plane 23*c*.

In other words, the slit hole 13 of the first blade 10 has a straight-line shape as shown in FIG. 3A such that the slit hole 13 can always transmit a uniform amount of displacement to the first blade 10 when the drive pin 44*a* rotates in a predetermined angle range. On the other hand, when the drive pin 44*b* rotates in a predetermined angle range, the slit hole 23 of the second blade 20 transmits different amounts of displacement to the blade on the slit associating planes 23*a* and 23*b*. In this case, the slit associating plane 23*b* transmits a amount of displacement larger than that of the slit associating plane 23*a*. The amount of displacement to be transmitted by the slit associating plane 23*a* is defined equal to the amount of displacement to be transmitted by the slit hole 13 of the first blade 10. Thus, when the drive pin 44*b* associates with the associating plane 23*a* of the slit hole 23, the second blade 20 moves at a speed equal to that of the first blade 10. When the drive pin 43*b* associates with the associating plane 23*c*, the second blade 20 moves at a speed higher that that of the first blade 10. The associating plane 23*b* of the slit hole 23 shown in FIG. 3B has a slit-hole shape allowing the movement at an equal speed to that of the first blade 10, for example.

A relationship between the transmitting unit (association construction between the drive pins and slit holes) and the movements of the blades will be described with reference to FIGS. 4A to 4C.

FIG. 4A shows an open state that the first and second blades entirely open the optical path opening 31 in the substrate 30, and the blades are positioned at the open positions. FIG. 4B shows an aperture state in which the first and second blades cover a part of the optical path opening 31, and the blades are positioned at middle positions. FIG. 4C shows a closed state that the first and second blades completely cover the optical path opening 31, and the blades are positioned at the closed positions. The optical axis Y-Y is aligned with the center of the optical path opening 31 of the substrate 30. L0 refers to a stroke length that the first and second blades move from the open positions to the closed positions. L1 refers to a stroke length that the first and second blades move from the open positions to the middle positions. L2 refers to a stroke length that the first and second blades move from the middle positions to the closed positions. The shown a, b and c refer to center points of the openings 11 and 21 of the first and second blades.

Figure 6A:
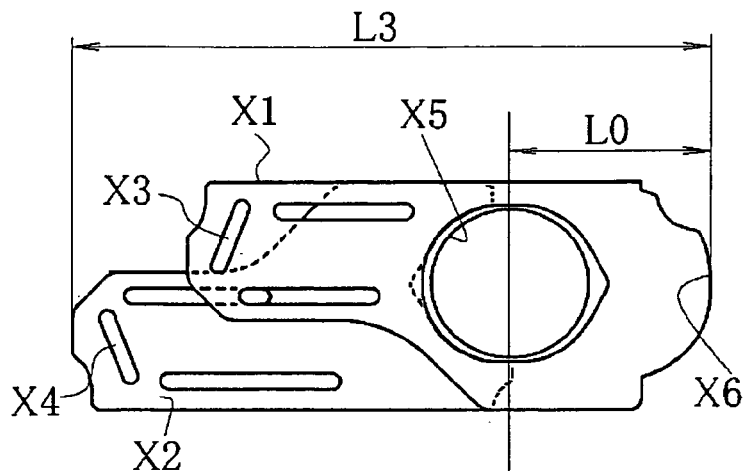
Figure 6B:
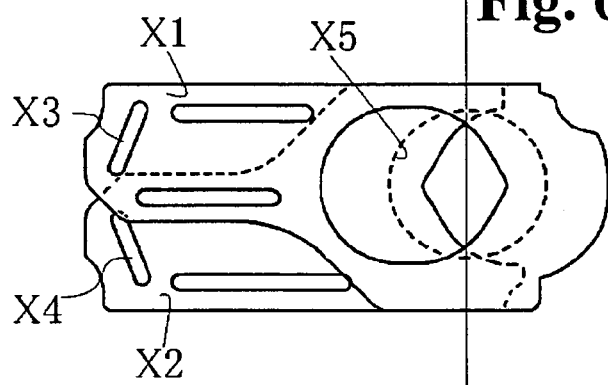

With this construction, when the first and second blades move from the open positions (at the state in FIG. 6A) to the middle positions (at the state in FIG. 6B), the drive pin 44*a* moves the first blade 10 at a predetermined speed along the slit hole 13, and the drive pin 44*b* moves the second blade 20 at an speed equal to that of the first blade 10 along the associating surface 23*a* of the slit hole 23. Thus, the first and second blades 10 and 20 move from the center aligned with the optical axis Y-Y to the center b aligned with the optical axis Y-Y. At the middle positions, the amount of light passing through the optical path opening 31 is adjusted by the aperture diameter formed by aperture planes 11*a* and 21*a* of the first and second blades 10 and 20. The size of the aperture formed by the first and second blades 10 and 20 can be freely defined by adjusting an amount of rotation of the axis of rotation 42 of the driver 41.

When the first and second blades 10 and 20 move from the middle positions (at the state in FIG. 6B) to the closed positions (at the state in FIG. 6C), the drive pin 44*a* moves the first blade 10 along the slit hole 13*b* at a speed equal to the speed of the movement from the open positions to the middle positions. The drive pin 44*b* moves the second blade 20 along the associating plane 23*c* of the slit hole 23 at a speed higher than that of the first blade 10. Thus, the first and second blades 10 and 20 overlap with each other and completely close the optical path opening 31.

Figure 6C:
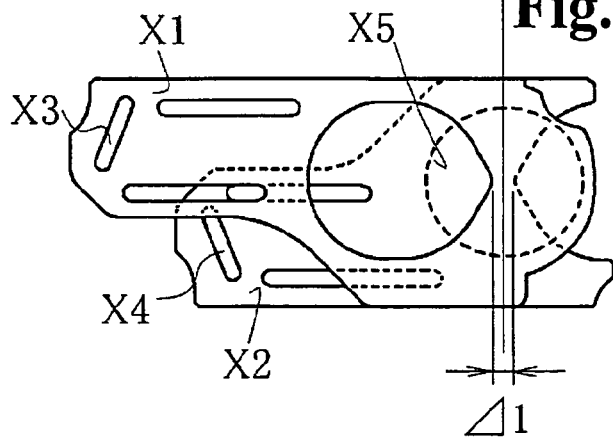
Figure 7A:
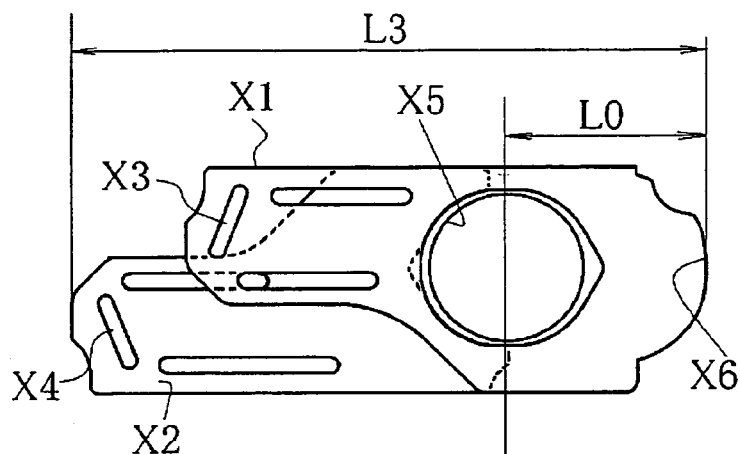
Figure 7B:
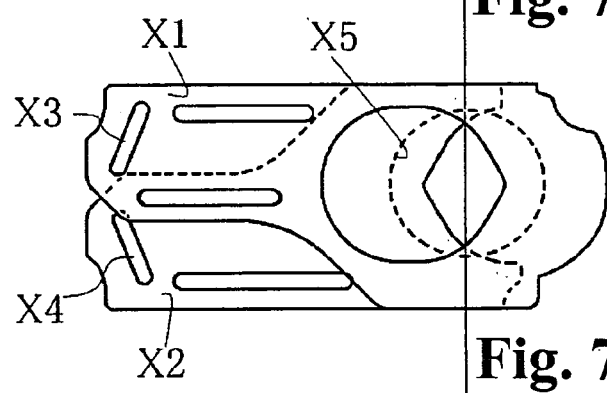
Figure 7C:
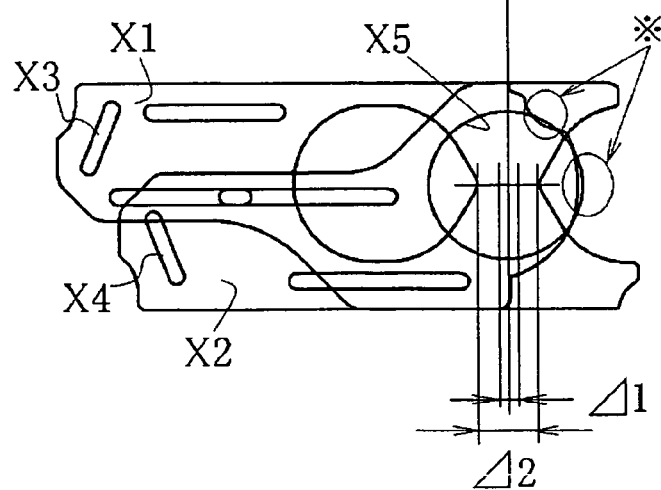
Figure 8A:
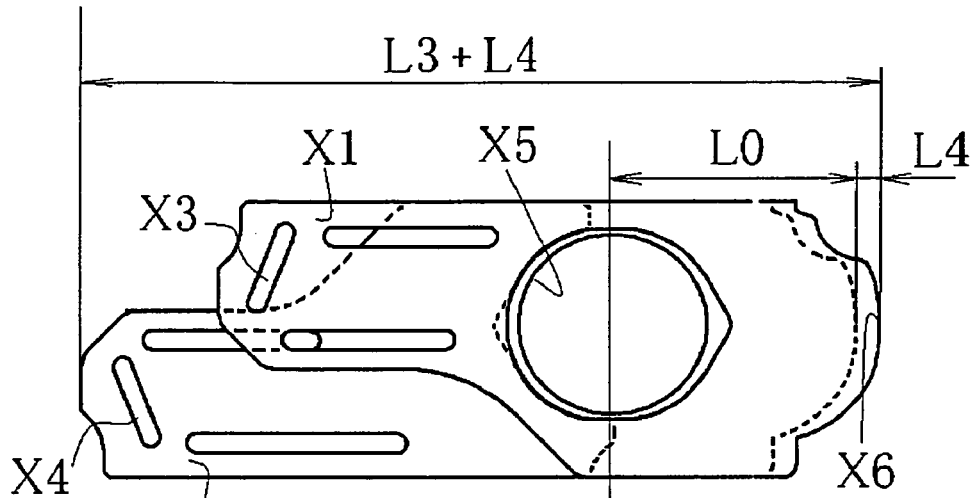
Figure 8B:
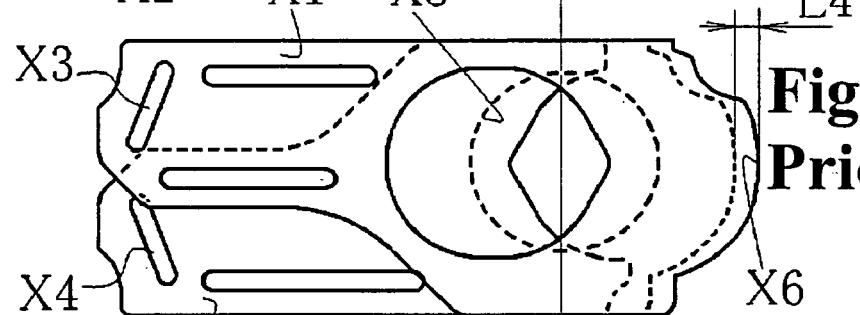
Figure 8C:
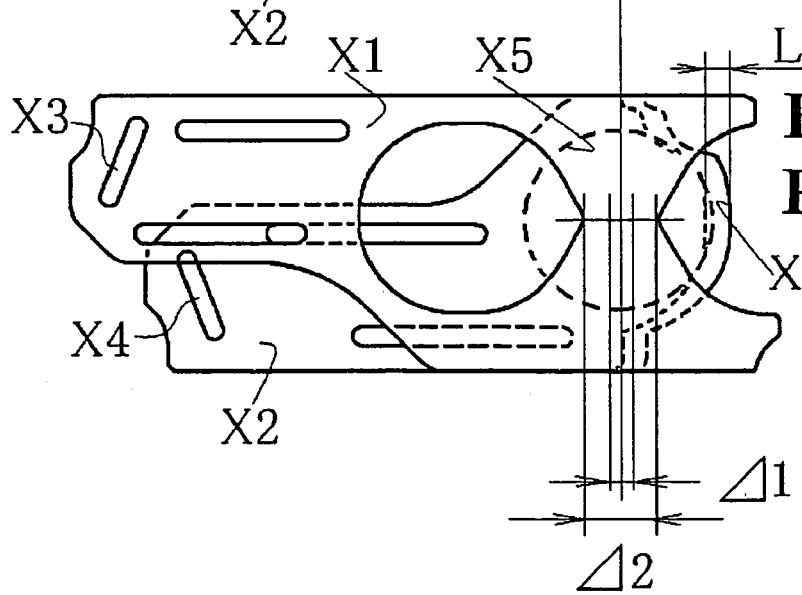

The amount of overlapping of the first and second blades 10 and 20 at the state is Delta 2 shown in FIG. 6C, and the center c of the blades are displaced by the shown Delta from the optical axis Y-Y. The second blade 20 moves at a higher speed and the first blade 10 moves at a lower speed from the middle positions (aperture) to the closed positions, and the blades overlap with each other above the optical axis opening 31 and close the optical path opening 31. Therefore, the movement stroke of the first blade 10 is shorter while the movement stroke of the second blade 20 is longer, which prevents the end face (on the right side in FIG. 4) of the first blade 10 from entering into the optical path opening 31 and causing a leak of light from a gap caused there.

The first and second blades 10 and 20 moving from the open positions to the closed positions have different speeds from each other in the entire stroke or in a predetermined range of the stroke. As a result, the blade having an end face, which may enter to the optical path opening 31 at the entirely closed state, is moved at a lower speed that that of the other blade so as to prevent a gap between the end face and the edge of the optical path opening edge without increasing the size of the blade or blades. Furthermore, at the closed positions, the amount of overlapping Delta 2 can be obtained by the displacement of the center c of the overlapping first and second blades 10 and 20 from the optical axis by the shown Delta.

FIGS. 5A and 5B show a relationship between the drive pin 44*b* and the slit hole 23 of the second blade 20. The associating plane 23*a* of the slit hole 23 has a form symmetric to that of the slit hole 13 of the first blade 10 and tilts by an angle $\theta 1$ with respect to the direction of the movement of the blades such that the drive pin 44*b* can be displaced at a speed equal to that of the first blade 10 in the range L1 that the drive pin 44*b* moves by associating with the associating plane 23*a* of the slit hole 23. The associating plane 23*c* of the slit hole 23 tilts by an angle $\theta 2$ with respect to the direction of the movement of the blades such that the drive pin 44*b* can be displaced at a speed higher than that of the first blade 10 in the range L2 that the drive pin 44*b* moves by associating with the associating plane 23*c* of the slit hole 23. The angle $\theta 1$ is larger than the angle $\theta 2$.

Next, an image pickup device including the above-described light controller will be described with reference to FIG. 1. The light controller is built in a lens barrel of a still camera, a video camera and so on. FIG. 1 includes a front lens A and rear lens B placed in a shooting optical path, and an image pickup device S is disposed on the imaging plane on which a subject image is formed by the lenses. The image pickup device S may be a solid-state image pickup device or a light-sensitive film. The control is performed by a CPU control circuit, an exposure control circuit, and a shutter driver circuit. FIG. 1 further includes a main power supply switch SW1 and a shutter release switch SW2. The control to be performed in a camera apparatus additionally uses an auto-focus circuit, for example, and the description is omitted herein since the construction is well known.

The substrate 30 is built between the front lens A and rear lens B built in the lens barrel. The first and second blades 10 and 20 and the driver 41 are built on the substrate 30 as the light controller unit. The control CPU defines shooting conditions including an amount of exposure and a shutter speed and outputs command signals to the exposure control circuit and shutter driver circuit. In order to adjust an amount of exposure, the exposure control circuit first supplies current in a predetermined direction to the coil of the driver 41 in response to the command signal from the control CPU. The rotation of the driver 41 is transmitted from the drive pins 44a and 44b to the first and second blades 10 and 20 through the transmitting arms 43, and the first and second blades 10 and 20 close the optical path opening 31 to an optimum amount of light exposure at the middle positions in FIG. 4B.

The first blade 10 and second blade 20 at the middle positions move to open or close at an equal speed by an equal amount of displacement and stop at optimum positions. Here, the center b of the aperture of the first and second blades 10 and 20 agrees with the optical axis Y-Y, and an aperture diameter is formed by the first and second blades 10 and 20 moving to the left and right about the optical axis. Therefore, the aperture diameter is determined in proportion to the amount of current supplied to the coil of the driver 41.

When a release button is pushed, already charged charges are discharged from the solid-state image pickup device such as a CCD, for example, and shooting is started. Next, the shutter driver circuit supplies current in the direction of the shutter closing to the coil of the driver 40 in response to a signal for starting a shutter operation after a lapse of a predefined light exposure time from the control CPU. Thus, the drive pins 44a and 44b transmit the rotation of the driver 41 to the first and second blades 10 and 20 through the transmitting arms 43, and the first and second blades 10 and 20 move from the state in FIG. 4B to the state in FIG. 4C as described above. The first blade 10 moves at a speed lower than that of the second blade 20, and the first and second blades 10 and 20 overlap with each other and completely close the optical path opening 31. After the shutter operation, if the image pickup device is a CCD (solid-state image pickup device), image data is transferred to an image processing circuit of the CCD and stored in a memory, for example.

As described above, according to the invention, one blade is moved at a speed higher than that of the other blade in a predetermined range of movement defined between the open positions and closed positions when the pair of blades facing toward an optical path opening is driven to open or close by a driver. Thus, a blade easily causing a gap between the optical path opening and an edge of the blade may be defined to move at a lower speed while the other blade may be defined to move at a higher speed so as to prevent the gap at the edges of the blade.

Therefore, the size of the apparatus and the load on the driver for the blades can be reduced without particularly increasing an amount of overlapping between the blades. Furthermore, a simple and inexpensive construction therefore can be achieved by pins and slit holes in a transmitting arm, which is provided at the axis of rotation of the driver, and blades, and the slit holes only need to differentiate amounts of movement and displacement between one blade and the other blade.

The size of the blades and an amount of overlapping between the blades can be reduced by moving a pair of blades at an equal speed (amount of movement and displacement) from the entirely open positions to middle positions and moving one blade at a higher speed and the other blade at a lower speed from the middle positions to the entirely closed positions where the pair of blades are adjusted sequentially at the entirely open positions, middle positions and entirely closed positions as in a dual-purpose diaphragm and shutter device.

The disclosure of Japanese Patent Application No. 2004-240291, filed on Aug. 20, 2004, is incorporated in the application.

While the invention has been explained with reference to the specific embodiments of the invention, the explanation is illustrative and the invention is limited only by the appended claims.

What is claimed is:

1. A light controller, comprising:
   a substrate having an optical path opening,
   at least two blades supported on the substrate to be reciprocally movable between an open position for opening the optical path opening and a closed position for closing the optical path opening by overlapping with each other,
   a driver device for moving the at least two blades between the open position and the closed position, and
   a transmission device for transmitting movement of the driver device to the at least two blades so that one of the at least two blades moves at a speed higher than that of the other of the at least two blades within a predetermined range between the open position and the closed position,
   wherein said transmission device includes slits formed in the respective blades, and a transmitting arm member formed on a rotation axis of the driver device and having at least two drive pins engaging the slits.

2. A light controller according to claim 1, wherein said transmission device moves the at least two blades at a substantially equal speed between the open position and a middle position away from the open position by a predetermined distance, and moves said one of the at least two blades at a speed higher than that of the other between the middle position and the closed position.

3. A light controller according to claim 1, wherein said slits have symmetrical portions so that the at least two blades move for an equal distance when the at least two drive pins move, and asymmetrical portions so that the at least two blades move for different distances when the at least two drive pins move.

4. A light controller according to claim 1, wherein said at least two blades overlap with each other at the closed position, said transmission device moving the one of the at least two blades at a speed higher than that of the other of the at least two blades in the predetermined range from the open position to the closed position.

5. A light controller, comprising:
   a substrate having an optical path opening,
   first and second blades supported on the substrate to be movable between an open position for opening the optical path opening and a closed position for closing the optical path opening,
   a driver device for moving the first and second blades between the open position and the closed position, and
   a transmitting arm member connected to the first and second blades for transmitting movement of the driver device to the first and second blades in opposite directions so that the first blade moves at a substantially constant speed between the open position and the closed position, and the second blade moves at a speed substantially equal to that of the first blade between the open position and a middle position away from the open position and moves at a speed higher than that of the first blade between the middle position and the closed position.

6. An image pickup device comprising: an image-forming lens disposed in an optical path from a subject, the light controller according to claim 5 arranged so that the optical path opening is situated in the optical path, and an image pickup device for forming an image of light passing through the image-forming lens and the light controller.

7. An image pickup device according to claim 6, wherein said driver device includes a control device for moving the first and second blades from the open position to the middle position according to an amount of light exposure for shooting of the image pickup device so that the first and second blades control an amount of light passing through the optical path opening at the middle position, said control device moving the first and second blades from the middle position to the closed position when the image pickup device finishes forming the image.

8. An image pickup device comprising: an image-forming lens disposed in an optical path from a subject, the light controller according to claim 1 arranged so that the optical path opening is situated in the optical path, and an image pickup device for forming an image of light passing through the image-forming lens and the light controller.

9. An image pickup device according to claim 8, wherein said driver device includes a control device for moving the at least two blades from the open position to a middle position according to an amount of light exposure for shooting of the image pickup device so that the at least two blades control an amount of light passing through the optical path opening at the middle position, said control device moving the at least two blades from the middle position to the closed position when the image pickup device finishes forming the image.

* * * * *